(12) United States Patent
Fang et al.

(10) Patent No.: US 8,804,057 B2
(45) Date of Patent: Aug. 12, 2014

(54) 3D DISPLAY PANEL AND 3D DISPLAY SYSTEM

(75) Inventors: Bin Fang, Shenzhen (CN); Chia-chiang Hsiao, Shenzhen (CN); Chih-wen Chen, Shenzhen (CN)

(73) Assignee: Shenzhen China Star Optoelectronics Technology Co., Ltd, Guangdong (CN)

( * ) Notice: Subject to any disclaimer, the term of this patent is extended or adjusted under 35 U.S.C. 154(b) by 293 days.

(21) Appl. No.: 13/501,458

(22) PCT Filed: Mar. 9, 2012

(86) PCT No.: PCT/CN2012/072127
§ 371 (c)(1),
(2), (4) Date: Apr. 12, 2012

(87) PCT Pub. No.: WO2013/127097
PCT Pub. Date: Sep. 6, 2013

(65) Prior Publication Data
US 2013/0222711 A1    Aug. 29, 2013

(30) Foreign Application Priority Data

Feb. 29, 2012  (CN) .......................... 2012 1 0050180

(51) Int. Cl.
G02F 1/1335    (2006.01)
H04N 13/04    (2006.01)
G02B 27/22    (2006.01)
G02B 27/26    (2006.01)
G02F 1/13363    (2006.01)

(52) U.S. Cl.
CPC ............ G02B 27/2214 (2013.01); G02B 27/26 (2013.01); G02F 1/13363 (2013.01); H04N 13/0409 (2013.01)
USPC ................................ 349/15; 349/117; 348/51

(58) Field of Classification Search
CPC . G02B 27/26; G02B 27/2214; H04N 13/0409
USPC ......................... 349/15, 117–119; 348/42–60; 359/462–177
See application file for complete search history.

(56) References Cited

U.S. PATENT DOCUMENTS

| | | | | |
|---|---|---|---|---|
| 6,222,672 | B1 * | 4/2001 | Towler et al. | 349/15 |
| 6,252,624 | B1 * | 6/2001 | Yuasa et al. | 348/56 |
| 8,553,162 | B2 * | 10/2013 | Yamaguchi et al. | 349/15 |
| 8,643,821 | B2 * | 2/2014 | Fang et al. | 349/96 |

* cited by examiner

Primary Examiner — Dung Nguyen

(57) ABSTRACT

The present invention provides a 3D display panel and a 3D display system. The system comprises the 3D display panel and polarizer glasses. A first optical retardation value of a quarter wave ($\lambda/4$) retarder film of the 3D display panel can be designed according to a second optical retardation value of the polarizer glasses. The present invention can improve a narrow viewing angle problem existing in the conventional 3D display.

17 Claims, 3 Drawing Sheets

3D DISPLAY PANEL AND 3D DISPLAY SYSTEM

FIELD OF THE INVENTION

The present invention relates to a display panel and a display system, and more particularly to a three-dimensional (3D) display panel and a 3D display system for displaying 3D images.

BACKGROUND OF THE INVENTION

Liquid crystal displays (LCDs) have been widely applied in electrical products. Currently, most of LCDs are backlight type LCDs which include a liquid crystal panel and a backlight module.

At present, the LCDs are capable of having a 3D image displaying function. For example, a 3D pattern retarder display, which has a half ($\frac{1}{2}$) wave plate and a quarter ($\frac{1}{4}$) wave plate being disposed at an outer side of an LCD panel, is capable of displaying 3D images.

In general, the pattern retarder display has left image pixels and right image pixels. The left image pixels are positioned at odd pixel rows (or even pixel rows) of the display, and the right image pixels are positioned at the other pixel rows thereof. When the light of the display passes through the half-wave phase retarders and the quarter-wave phase retarders with different orientations, the light is transformed into a left handed circularly polarized light and a right handed circularly polarized light, respectively. A user can use circular polarizer glasses with different polarized directions such that the user's left eye only sees images of the left image pixels, and the user's right eye only sees images of the right image pixels. Therefore, the 3D image effect of the display is achieved.

However, when a user squints at the conventional 3D display, the light rays emitted from the 3D display are likely to be non-circularly polarized light rays (such as elliptically polarized light), and thus an image crosstalk easily arises to deteriorate a 3D display quality. That is, the conventional 3D display is likely to have a narrow viewing angle problem.

SUMMARY OF THE INVENTION

The present invention provides a 3D display panel and a 3D display system, so as to improve the narrow viewing angle problem existing in the conventional 3D display.

A primary object of the present invention is to provide a 3D display panel, and the 3D display panel comprises: a first substrate; a second substrate; a liquid crystal layer formed between the first substrate and the second substrate; a first polarizer disposed at an outer side of the first substrate; a second polarizer disposed at an outer side of the second substrate; and a quarter wave ($\lambda/4$) retarder film disposed at an outer side of the first substrate, wherein the quarter wave retarder film has a first optical retardation value (R1), and a user's polarizer glasses have a second optical retardation value (R2), and a relation between the first optical retardation value (R1) and the second optical retardation value (R2) is expressed as: $(R1/0.91) \leq R2 \leq (R1/0.77)$.

Another object of the present invention is to provide a 3D display panel, and the 3D display panel comprises: a first substrate; a second substrate; a liquid crystal layer formed between the first substrate and the second substrate; a first polarizer disposed at an outer side of the first substrate; a second polarizer disposed at an outer side of the second substrate; and a quarter wave ($\lambda/4$) retarder film disposed at an outer side of the first substrate, wherein the quarter wave retarder film has a first optical retardation value (R1), and a user's polarizer glasses have a second optical retardation value (R2), and a relation between the first optical retardation value (R1) and the second optical retardation value (R2) is expressed as: $(R1/0.91) \leq R2 \leq (R1/0.77)$, wherein the quarter wave retarder film and the polarizer glasses have different thickness or materials.

Still another object of the present invention is to provide a 3D display system, and the 3D display system comprises a 3D display panel and polarizer glasses. The 3D display panel comprises: a first substrate; a second substrate; a liquid crystal layer formed between the first substrate and the second substrate; a first polarizer disposed at an outer side of the first substrate; a second polarizer disposed at an outer side of the second substrate; and a quarter wave ($\lambda/4$) retarder film disposed at an outer side of the first substrate, wherein the quarter wave retarder film has a first optical retardation value (R1). The polarizer glasses have a second optical retardation value (R2), wherein a relation between the first optical retardation value (R1) and the second optical retardation value (R2) is expressed as: $(R1/0.91) \leq R2 \leq (R1/0.77)$.

In one embodiment of the present invention, the relation between the first optical retardation value (R1) and the second optical retardation value (R2) is further expressed as: $(R1/0.9) \leq R2 \leq (R1/0.8)$.

In one embodiment of the present invention, the relation between the first optical retardation value (R1) and the second optical retardation value (R2) is further expressed as: $R2 = (R1/0.88)$.

In one embodiment of the present invention, the relation between the first optical retardation value (R1) and the second optical retardation value (R2) is further expressed as: $R2 = (R1/0.85)$.

In one embodiment of the present invention, the relation between the first optical retardation value (R1) and the second optical retardation value (R2) is further expressed as: $R2 = (R1/0.82)$.

In one embodiment of the present invention, a material of the quarter wave retarder film is different to a material of the polarizer glasses.

In one embodiment of the present invention, a thickness of the quarter wave retarder film is different to a thickness of the polarizer glasses.

In one embodiment of the present invention, both a material and a thickness of the quarter wave retarder film are different to a material and a thickness of the polarizer glasses.

In comparison with the viewing angle problem existing in the conventional 3D display, with the use of the 3D display panel and the display system of the present invention, the viewing angle range can be greatly broadened for improving the narrow viewing angle problem existing in the conventional 3D display, as well as enhancing a display quality of the 3D display panel.

The structure and the technical means adopted by the present invention to achieve the above-mentioned and other objects can be best understood by referring to the following detailed description of the preferred embodiments and the accompanying drawings.

DETAILED DESCRIPTION OF THE PREFERRED EMBODIMENTS

Figure 1:
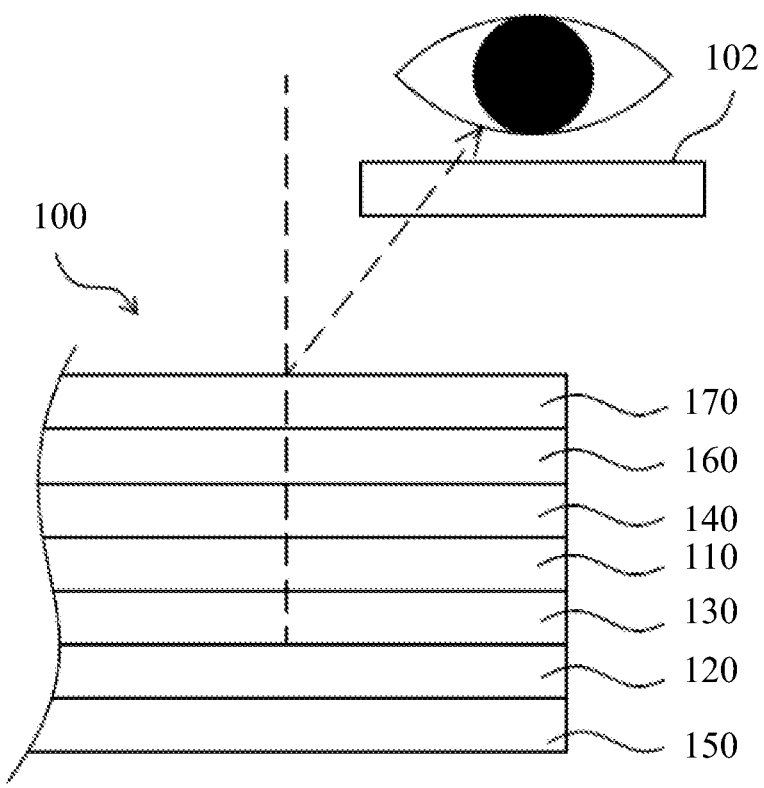
FIG. 1 is a partially cross-sectional view showing a 3D display system according to an embodiment of the present invention.

The following embodiments are referring to the accompanying drawings for exemplifying specific implementable embodiments of the present invention. Furthermore, directional terms described by the present invention, such as upper, lower, front, back, left, right, inner, outer, side and etc., are only directions by referring to the accompanying drawings, and thus the used directional terms are used to describe and understand the present invention, but the present invention is not limited thereto.

In the drawings, structure-like elements are labeled with like reference numerals.

Referring to FIG. 1, a partially cross-sectional view showing a 3D display system according to an embodiment of the present invention is illustrated. The 3D display system of the present embodiment comprises a 3D display panel 100 and polarizer glasses 102. The 3D display panel 100 is capable of displaying 3D images. The 3D display panel 100 can be assembled with a backlight module (not shown), thereby forming a display apparatus. The display panel 100 is disposed opposite to the backlight module, and the backlight module may be realized as an edge lighting backlight module or a bottom lighting backlight module to provide the 3D display panel 100 with the back-light. When a user views the 3D images displayed by the 3D display panel 100, the polarizer glasses 102 is used to form a stereoscopic image effect.

Referring to FIG. 1 again, the 3D display panel 100 of the present embodiment can comprise a first substrate 110, a second substrate 120, a liquid crystal layer 130, a first polarizer 140, a second polarizer 150, a quarter wave (λ/4) retarder film 160 and a cover substrate 170. The first substrate 110 and the second substrate 120 may be realized as glass substrates or flexible plastic substrates. In this embodiment, the first substrate 110 may be a glass substrate or other material substrates with color filters (CF), and the second substrate 120 may be a glass substrate or other material substrates with a thin film transistor (TFT) array. It should be noted that the CF and the TFT array may also be disposed on the same substrate in other embodiments.

Referring to FIG. 1 again, the liquid crystal layer 130 is formed between the first substrate 110 and the second substrate 120. The first polarizer 140 is disposed at an outer side of the first substrate 110, and the second polarizer 150 is disposed at an outer side of the second substrate 120. The λ/4 retarder film 160 is disposed at an outer side of the first polarizer 140. The cover substrate 170 is disposed on the λ/4 retarder film 160. The cover substrate 170 is, for example, a cover lens and preferably made of a material of high strength, such as glass, carbon fiber, reinforced plastics or any combination thereof, for protecting and packaging the structure of the display panel 100. In one embodiment, surface treatments for AG and/or AR (such as the anti-glare film and/or the anti-reflection film) can be performed on an outer surface of the cover substrate 170.

When the user uses the polarizer glasses 102 to view the 3D images displayed by the 3D display panel 100, a linearly polarized light emitted from the first polarizer 140 can be transformed into a left handed circularly polarized light or a right handed circularly polarized light by the λ/4 retarder film 160. Since the left handed circularly polarized light or the right handed circularly polarized light emitted from the 3D display panel 100 is allowed to pass through only one side (a right side or a left side) of the polarizer glasses. In other words, the user's eyes can view images of different pixel rows of the 3D display panel 100, respectively, thereby forming the stereoscopic image effect.

In this embodiment, the λ/4 retarder film 160 of the 3D display panel 100 has a first optical retardation value R1, and the user's polarizer glasses have a second optical retardation value R2, wherein a relation between the first optical retardation value R1 and the second optical retardation value R2 is expressed as:

$$(R1/0.91) \leq R2 \leq (R1/0.77) \qquad (1)$$

In this embodiment, the first optical retardation value R1 of the λ/4 retarder film 160 can be adjusted according to the second optical retardation value R2 of the polarizer glasses 102 for satisfying the above-mentioned equation (1). For example, a thickness or a material of the λ/4 retarder film 160 can be adjusted according to the second optical retardation value R2 of the polarizer glasses 102, so as to adjust the first optical retardation value R1 of the λ/4 retarder film 160, thereby satisfying the above-mentioned equation (1).

In another embodiment, the second optical retardation value R2 of the polarizer glasses 102 can be adjusted according to the first optical retardation value R1 of the λ/4 retarder film 160 for satisfying the above-mentioned equation (1). For example, a thickness or a material of the polarizer glasses 102 can be adjusted according to the first optical retardation value R1 of the λ/4 retarder film 160, so as to adjust the second optical retardation value R2, thereby satisfying the above-mentioned equation (1).

Therefore, the materials and/or thickness of the λ/4 retarder film 160 and the polarizer glasses 102 can be adjusted, respectively, so as to adjust the first optical retardation value R1 and the second optical retardation value R2. For example, the thickness of the λ/4 retarder film 160 and the polarizer glasses 102 can be identical, and the material of the λ/4 retarder film 160 is different to the material of the polarizer glasses 102. Alternatively, the materials of the λ/4 retarder film 160 and the polarizer glasses 102 can be identical, and the thickness of the λ/4 retarder film 160 is different to the thickness of the polarizer glasses 102. Moreover, both the material and the thickness of the λ/4 retarder film 160 can be different to the material and the thickness of the polarizer glasses 102.

In a further embodiment, the relation between the first optical retardation value R1 and the second optical retardation value R2 can be further expressed as:

$$(R1/0.9) \leq R2 \leq (R1/0.8) \qquad (2)$$

Figure 2:
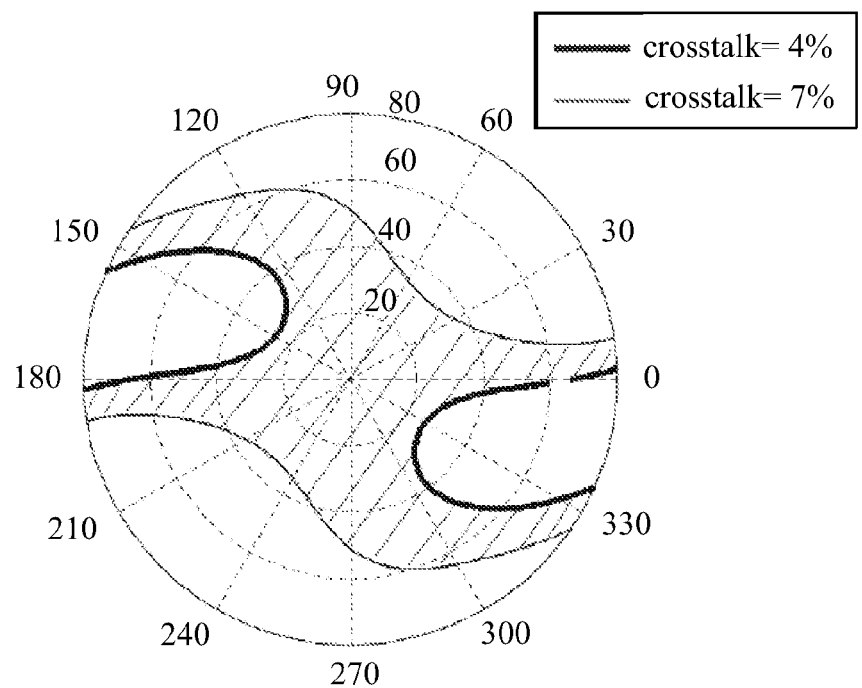
FIG. 2 is a view showing a viewing angle characteristic relating to different cross-talks of a 3D display system when the first optical retardation value is equal to the second optical retardation value (R1=R2)
Figure 3:
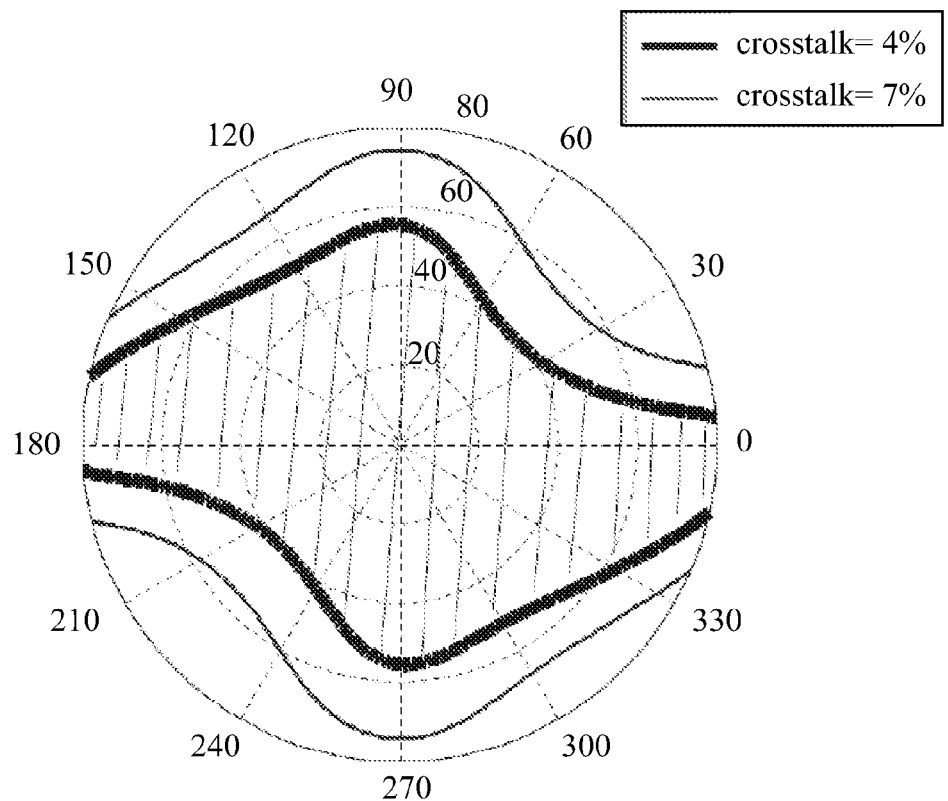
FIG. 3 is a view showing a viewing angle characteristic relating to different cross-talks of the 3D display system according to the present invention when R2=(R1/0.88)

Referring to FIG. 2 and FIG. 3, FIG. 2 is a view showing a viewing angle characteristic relating to different cross-talks of a 3D display system when the first optical retardation value is equal to the second optical retardation value (R1=R2), and FIG. 3 is a view showing a viewing angle characteristic relating to different cross-talks of the 3D display system according to the present invention when R2=(R1/0.88). In the measured 3D display system corresponding to FIG. 2, the first optical retardation value R1 of the λ/4 retarder film 160 is equal to the second optical retardation value R2 of the polarizer glasses 102. Apparently, in comparison with the viewing angle characteristic shown in FIG. 2, the range of the viewing angle shown in FIG. 3 is broader. Therefore, in comparison with the range of the viewing angle of the 3D display system when R1=R2, the 3D display system of the present invention can have a broad viewing angle when, for example, R2=(R1/0.88).

Figure 4:
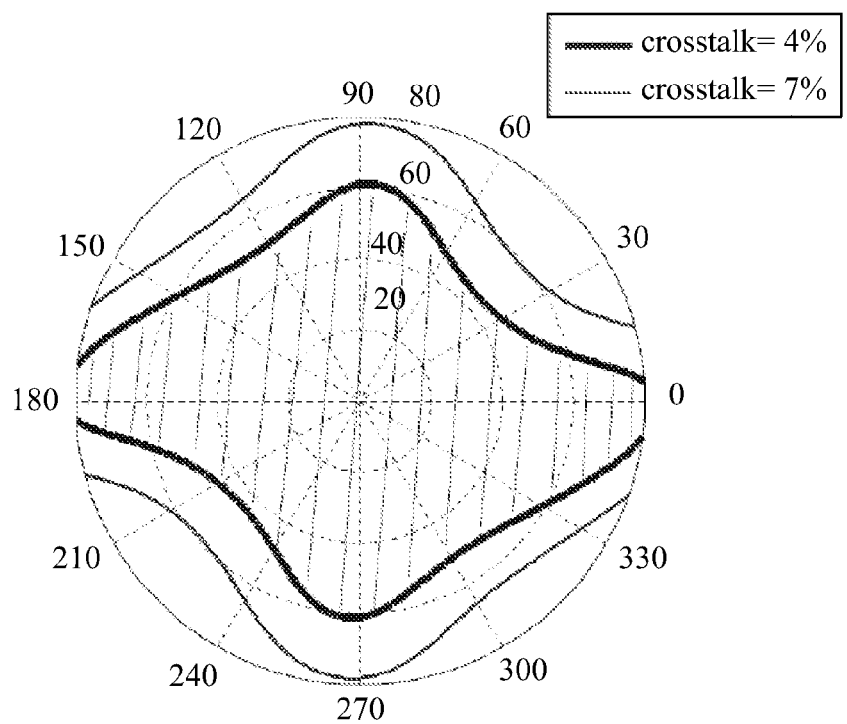
FIG. 4 is a view showing a viewing angle characteristic relating to different cross-talks of the 3D display system according to the present invention when R2=(R1/0.85)

Referring to FIG. 2 and FIG. 4, FIG. 4 is a view showing a viewing angle characteristic relating to different cross-talks of the 3D display system according to the present invention when R2=(R1/0.85). Apparently, in comparison with the viewing angle characteristic shown in FIG. 2, the range of the viewing angle shown in FIG. 4 is broader. Therefore, in comparison with the range of the viewing angle of the 3D display system when R1=R2, the 3D display system of the present invention can have a broad viewing angle when, for example, R2=(R1/0.85).

Figure 5:
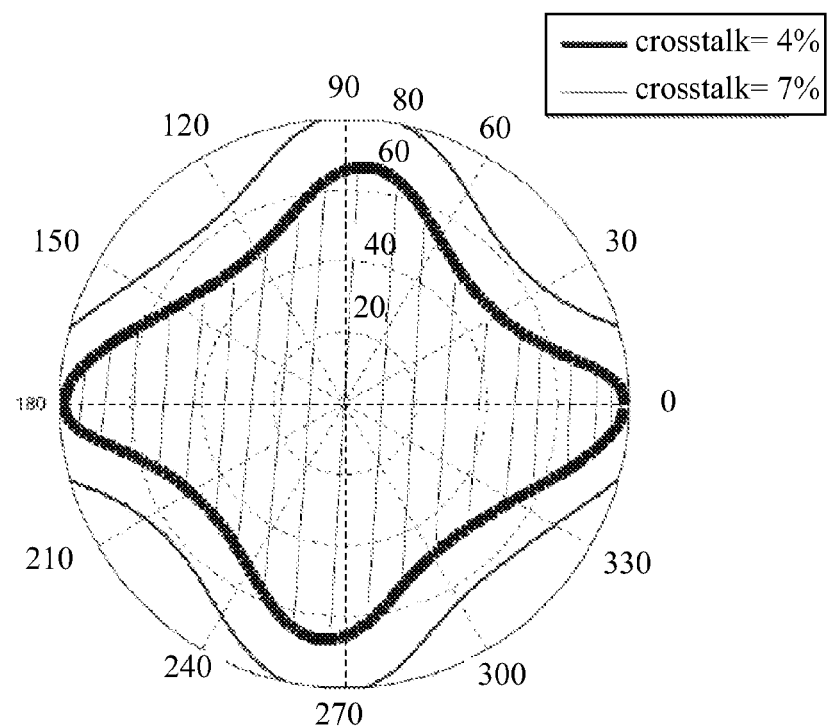
FIG. 5 is a view showing a viewing angle characteristic relating to different cross-talks of the 3D display system according to the present invention when R2=(R1/0.82).

Referring to FIG. 2 and FIG. 5, FIG. 5 is a view showing a viewing angle characteristic relating to different cross-talks of the 3D display system according to the present invention when R2=(R1/0.82). Apparently, in comparison with the viewing angle characteristic shown in FIG. 2, the range of the viewing angle shown in FIG. 5 is broader. Therefore, in comparison with the range of the viewing angle of the 3D display system when R1=R2, the 3D display system of the present invention can have a broad viewing angle when, for example, R2=(R1/0.82).

As described above, by adjusting the optical retardation between the elements (the λ/4 retarder film and the polarizer glasses) of the 3D display system of the present invention, the viewing angle range can be broadened for improving the narrow viewing angle problem existing in the conventional 3D display, as well as enhancing a display quality of the 3D display panel.

The present invention has been described above with a preferred embodiment thereof, and it is understood that many changes and modifications to the described embodiment can be carried out without departing from the scope and the spirit of the invention that is intended to be limited only by the appended claims.

The invention claimed is:

1. A three-dimensional (3D) display panel, comprising:
a first substrate;
a second substrate;
a liquid crystal layer formed between the first substrate and the second substrate;
a first polarizer disposed at an outer side of the first substrate;
a second polarizer disposed at an outer side of the second substrate; and
a quarter wave (λ/4) retarder film disposed at an outer side of the first substrate, wherein the quarter wave retarder film has a first optical retardation value (R1), and a user's polarizer glasses have a second optical retardation value (R2), and a relation between the first optical retardation value (R1) and the second optical retardation value (R2) is expressed as:

$(R1/0.91) \leq R2 \leq (R1/0.77)$;

wherein the quarter wave retarder film and the polarizer glasses have different thickness or materials.

2. A 3D display panel, comprising:
a first substrate;
a second substrate;
a liquid crystal layer formed between the first substrate and the second substrate;
a first polarizer disposed at an outer side of the first substrate;
a second polarizer disposed at an outer side of the second substrate; and
a quarter wave (λ/4) retarder film disposed at an outer side of the first substrate, wherein the quarter wave retarder film has a first optical retardation value (R1), and a user's polarizer glasses have a second optical retardation value (R2), and a relation between the first optical retardation value (R1) and the second optical retardation value (R2) is expressed as:

$(R1/0.91) \leq R2 \leq (R1/0.77)$.

3. The 3D display panel according to claim 2, wherein the relation between the first optical retardation value (R1) and the second optical retardation value (R2) is further expressed as:

$(R1/0.9) \leq R2 \leq (R1/0.8)$.

4. The 3D display panel according to claim 2, wherein the relation between the first optical retardation value (R1) and the second optical retardation value (R2) is further expressed as:

$R2 = (R1/0.88)$.

5. The 3D display panel according to claim 2, wherein the relation between the first optical retardation value (R1) and the second optical retardation value (R2) is further expressed as:

$R2 = (R1/0.85)$.

6. The 3D display panel according to claim 2, wherein the relation between the first optical retardation value (R1) and the second optical retardation value (R2) is further expressed as:

$R2 = (R1/0.82)$.

7. The 3D display panel according to claim 2, wherein a material of the quarter wave retarder film is different to a material of the polarizer glasses.

8. The 3D display panel according to claim 2, wherein a thickness of the quarter wave retarder film is different to a thickness of the polarizer glasses.

9. The 3D display panel according to claim 2, wherein both a material and a thickness of the quarter wave retarder film are different to a material and a thickness of the polarizer glasses.

10. A 3D display system, comprising:
a 3D display panel comprising:
a first substrate;
a second substrate;
a liquid crystal layer formed between the first substrate and the second substrate;
a first polarizer disposed at an outer side of the first substrate;
a second polarizer disposed at an outer side of the second substrate; and
a quarter wave (λ/4) retarder film disposed at an outer side of the first substrate, wherein the quarter wave retarder film has a first optical retardation value (R1); and
polarizer glasses having a second optical retardation value (R2), wherein a relation between the first optical retardation value (R1) and the second optical retardation value (R2) is expressed as:

$(R1/0.91) \leq R2 \leq (R1/0.77)$.

11. The 3D display system according to claim 10, wherein the relation between the first optical retardation value (R1) and the second optical retardation value (R2) is further expressed as:

$$(R1/0.9) \leq R2 \leq (R1/0.8).$$

12. The 3D display system according to claim 10, wherein the relation between the first optical retardation value (R1) and the second optical retardation value (R2) is further expressed as:

$$R2=(R1/0.88).$$

13. The 3D display system according to claim 10, wherein the relation between the first optical retardation value (R1) and the second optical retardation value (R2) is further expressed as:

$$R2=(R1/0.85).$$

14. The 3D display system according to claim 10, wherein the relation between the first optical retardation value (R1) and the second optical retardation value (R2) is further expressed as:

$$R2=(R1/0.82).$$

15. The 3D display system according to claim 10, wherein a material of the quarter wave retarder film is different to a material of the polarizer glasses.

16. The 3D display system according to claim 10, wherein a thickness of the quarter wave retarder film is different to a thickness of the polarizer glasses.

17. The 3D display system according to claim 10, wherein both a material and a thickness of the quarter wave retarder film are different to a material and a thickness of the polarizer glasses.

\* \* \* \* \*